(12) United States Patent
Cheng et al.

(10) Patent No.: US 12,127,040 B2
(45) Date of Patent: Oct. 22, 2024

(54) COMMUNICATION APPARATUS AND METHOD HAVING DATA TRANSMISSION SORTING MECHANISM

(71) Applicant: REALTEK SEMICONDUCTOR CORPORATION, Hsinchu (TW)

(72) Inventors: Chin Cheng, Hsinchu (TW); Yi-Xin Huang, Suzhou (CN); Xiao-Lu Ma, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 351 days.

(21) Appl. No.: 17/744,784

(22) Filed: May 16, 2022

(65) Prior Publication Data

US 2023/0062868 A1 Mar. 2, 2023

(30) Foreign Application Priority Data

Aug. 31, 2021 (CN) .......................... 202111007870.8

(51) Int. Cl.
*H04W 28/06* (2009.01)
*H04W 28/02* (2009.01)

(52) U.S. Cl.
CPC ....... *H04W 28/06* (2013.01); *H04W 28/0289* (2013.01)

(58) Field of Classification Search
CPC .......................... H04W 28/06; H04W 28/0289
See application file for complete search history.

(56) References Cited

U.S. PATENT DOCUMENTS

2016/0050586 A1* 2/2016 Miller .................... H04L 47/25
370/230
2017/0230809 A1 8/2017 D M et al.

FOREIGN PATENT DOCUMENTS

CN 106797548 A 5/2017

OTHER PUBLICATIONS

OA letter of a counterpart TW application (appl. No. 110136338) mailed on Nov. 17, 2022. Summary of the TW OA letter: 1. Claims 1, 5, 6 and 10 are rejected as allegedly being unpatentable in view of cited reference 1 (CN 106797548 A, also published as US2017230809A1). 2. Claims 2-4 and 7-9 are allowable. Correspondence bewteen claims of TW counterpart application and claims of US application: 1. Claims 1, 2-3, . . . , and 10 in TW counterpart application correspond to claims 1, 2-3, . . . and 10 in US application, respectively.

* cited by examiner

*Primary Examiner* — Derrick V Rose
(74) *Attorney, Agent, or Firm* — WPAT, P.C.

(57) ABSTRACT

The present invention discloses a communication method having data transmission sorting mechanism. Whether an object under process is a mobile terminated object is determined. When the object under process is the mobile terminated object, a processing priority is set to be the highest priority, a receiving process is performed and response content is generated when required. When the object under process is a mobile originated object, a transmission process is performed, the processing priority is set according to a processing priority setting of a related transmission entity and the mobile originated object is added to a transmission list. When an object transmission is not able to be performed, the response content is added to a response list. When the object transmission is able to be performed, the response content in the response list is transmitted first and the mobile originated object in the transmission list is transmitted subsequently.

10 Claims, 5 Drawing Sheets

COMMUNICATION APPARATUS AND METHOD HAVING DATA TRANSMISSION SORTING MECHANISM

BACKGROUND OF THE INVENTION

1. Field of the Invention

The present invention relates to a communication apparatus and a communication method having data transmission sorting mechanism.

2. Description of Related Art

A peer-to-peer logical link can be established by using reliable data service (RDS) protocol between a wireless communication apparatus and a packet data network gateway apparatus to provide a reliable data transmission service. The wireless communication apparatus may establish such a connection with a plurality of gateway apparatus, and data transmissions performed simultaneously by using a multiple of application programs are supported.

However, under the condition that the bandwidth of the wireless communication apparatus is limited, the data transmissions that use a multiple of application programs are difficult to be performed simultaneously in practical implementation. How to arrange a data transmission order among the wireless communication apparatus and the gateway apparatuses to increase the transmission efficiency is required to be addressed.

SUMMARY OF THE INVENTION

In consideration of the problem of the prior art, an object of the present invention is to supply a communication apparatus and a communication method having data transmission sorting mechanism.

The present invention discloses a communication apparatus having data transmission sorting mechanism and configured to perform communication based on a reliable data service (RDS) protocol that includes a communication circuit, a storage circuit and a processing circuit. The storage circuit is configured to store computer executable command. The processing circuit is electrically coupled to the communication circuit and the storage circuit, and is configured to retrieve the computer executable command to execute a communication method that includes steps outlined below. Whether an object under process is a mobile terminated object received through the communication circuit is determined. Under the condition that the object under process is determined to be the mobile terminated object, a related processing priority is set to be a highest priority, a receiving process is performed and a response content is generated when a response is required to be performed. Under the condition that the object under process is determined to be a mobile originated object, a transmission process is performed, the related processing priority is set according to a priority of a transmission entity that generates the mobile originated object and the mobile originated object is added to a transmission list. The response content that is not able to be transmitted is added to a response list when an object transmission is determined to be not able to be performed. The response content in the response list is transmitted through the communication circuit according to the processing priority first and the mobile originated object in the transmission list is transmitted through the communication circuit subsequently when the object transmission is determined to be able to be performed.

The present invention also discloses a communication method having data transmission sorting mechanism used in a communication apparatus, wherein the communication apparatus is configured to perform communication based on a reliable data service protocol. The communication method includes steps outlined below. Whether an object under process is a mobile terminated object received through a communication circuit is determined. Under the condition that the object under process is determined to be the mobile terminated object, a related processing priority is set to be a highest priority, a receiving process is performed and a response content is generated when a response is required to be performed. Under the condition that the object under process is determined to be a mobile originated object, a transmission process is performed, the related processing priority is set according to a priority of a transmission entity that generates the mobile originated object and the mobile originated object is added to a transmission list. The response content that is not able to be transmitted is added to a response list when an object transmission is determined to be not able to be performed. The response content in the response list is transmitted through the communication circuit according to the processing priority first and the mobile originated object in the transmission list is transmitted through the communication circuit subsequently when the object transmission is determined to be able to be performed.

These and other objectives of the present invention will no doubt become obvious to those of ordinary skill in the art behind reading the following detailed description of the preferred embodiments that are illustrated in the various figures and drawings.

DETAILED DESCRIPTION OF THE PREFERRED EMBODIMENTS

An aspect of the present invention is to provide a communication apparatus and a communication method having data transmission sorting mechanism to set the processing priority of data transmission according to the attributes, e.g., a type, a transmission entity priority and a determination of whether a retransmission is performed, of the object under process so as to increase transmission efficiency.

Figure 1:
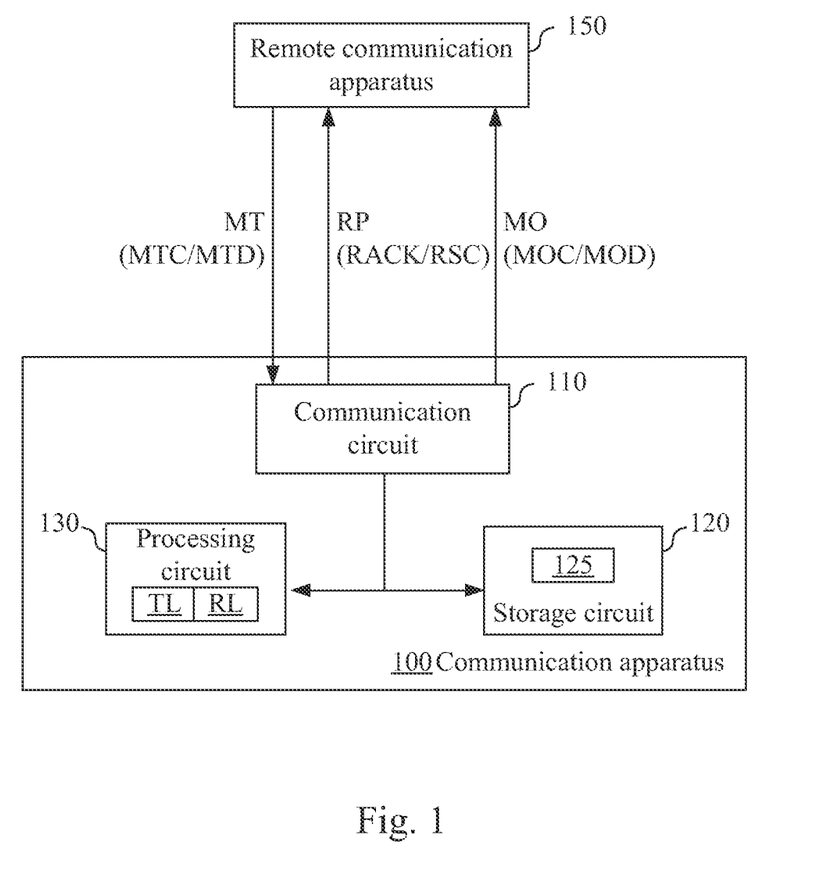
FIG. 1 illustrates a block diagram of a communication apparatus having data transmission sorting mechanism and a remote communication apparatus according to an embodiment of the present invention.

Reference is now made to FIG. 1. FIG. 1 illustrates a block diagram of a communication apparatus 100 having data transmission sorting mechanism and a remote communication apparatus 150 according to an embodiment of the present invention.

In an embodiment, the communication apparatus 100 can be such as, but not limited to a mobile communication apparatus, e.g., a cell phone or a tablet PC, or a computer device that can perform network communication, e.g., a desktop or a notebook. The remote communication apparatus 150 can be such as, but not limited to a packet data network (PDN) gateway apparatus. The communication apparatus 100 and the remote communication apparatus 150 may use such as, but not limited to reliable data service (RDS) protocol to establish a logic link to perform communication therebetween.

The communication apparatus 100 includes a communication circuit 110, a storage circuit 120 and a processing circuit 130.

The communication circuit 110 can be any circuit that is configured to perform communication with the remote communication apparatus 150 by using either wireless or wired communication technologies.

The storage circuit 120 can be any storage device that is configured to store data, such as but not limited to a random access memory (RAM), a read only memory (ROM) or a hard drive. It is appreciated that in different embodiments, the storage circuit 120 may include only one of the storage devices described above or may include a plurality of storage devices described above to store different types of data. In an embodiment, the storage circuit 120 is configured to store a computer executable command 125.

The processing circuit 130 is electrically coupled to the communication circuit 110 and storage circuit 120. In an embodiment, the processing circuit 130 is configured to retrieve and execute the computer executable command 125 from the storage circuit 120. The computer executable command 125 includes such as, but not limited to the firmware/driver and related commands of the hardware modules of the communication circuit 110 and the storage circuit 120 to access the signal or the data of the communication circuit 110 and storage circuit 120 to perform operation, so as to execute the function of the communication apparatus 100.

Figure 2:
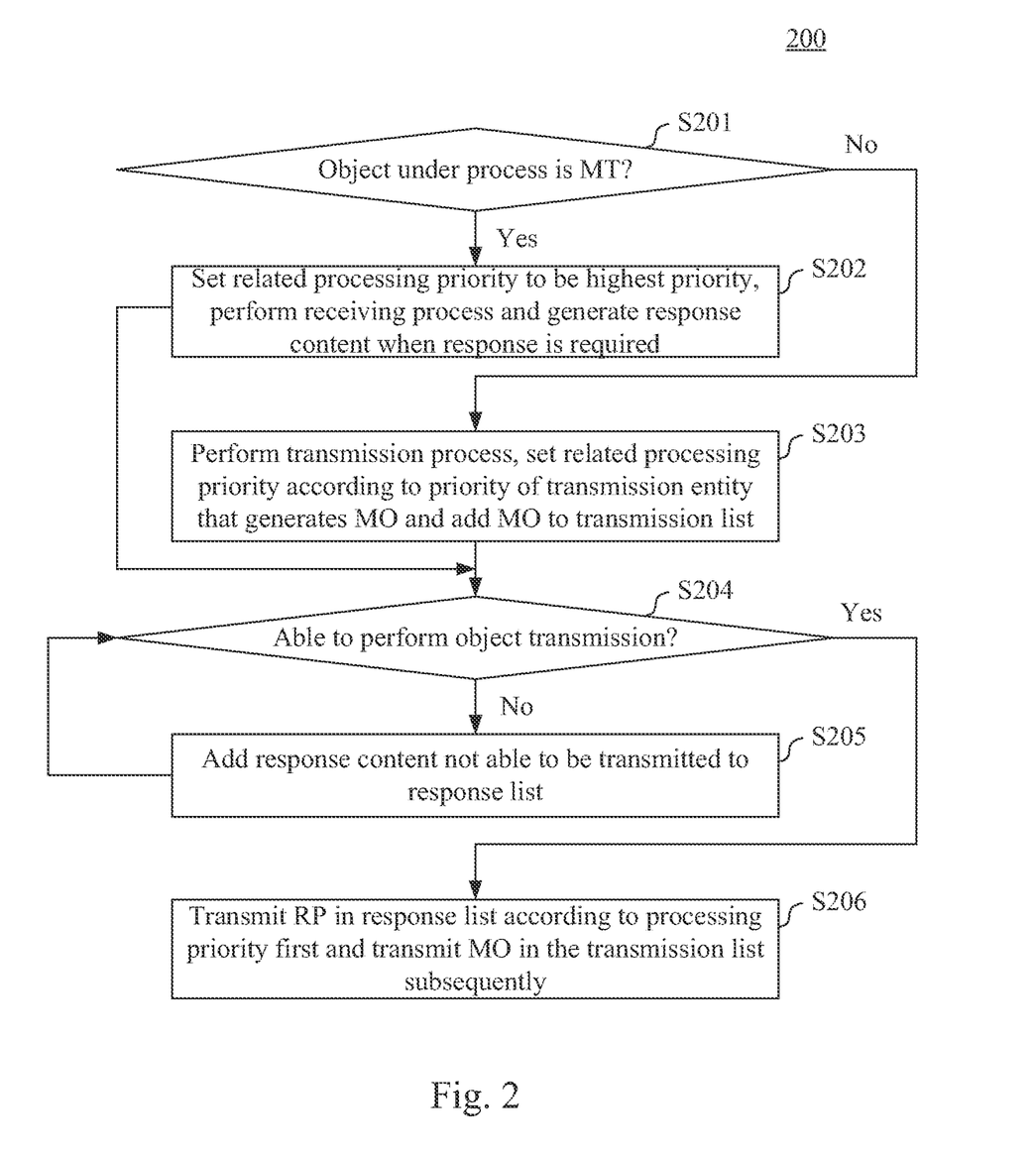
FIG. 2 illustrates a flow chart of a communication method having data transmission sorting mechanism according to an embodiment of the present invention.

The operation of the communication apparatus 100 is described in detail in accompany with FIG. 2.

FIG. 2 illustrates a flow chart of a communication method 200 having data transmission sorting mechanism according to an embodiment of the present invention. The communication method 200 can be used in such as, but not limited to the communication apparatus 100 in FIG. 1. An embodiment of the communication method 200 is illustrated in FIG. 2 and includes the steps outlined below.

In step S201, whether an object under process is a mobile terminated object MT is determined by the processing circuit 130. The mobile terminated object MT is an object received by the communication apparatus 100 through the communication circuit 110 from such as, but not limited the remote communication apparatus 150. According to the content included therein, the mobile terminated object MT can be a command (which is called a mobile terminated command MTC in the following description) or a data (which is called a mobile terminated data MTD in the following description).

In step S202, under the condition that the object under process is determined to be the mobile terminated object MT, a related processing priority is set to be a highest priority, a receiving process is performed and a response content RP is generated when a response is required to be performed by the processing circuit 130.

In an embodiment, according to the different contents of the mobile terminated object MT, the response content RP generated by the processing circuit 130 may be different. When the mobile terminated object MT is the mobile terminated command MTC, the response is determined to be required to be performed by the processing circuit 130 and a response command RSC is generated correspondingly. When the mobile terminated object MT is the mobile terminated data MTD, whether the response is required to be performed is determined according to a mode that the mobile terminated data MTD corresponds to by the processing circuit 130. When the response is required to be performed, a receiving acknowledged information RACK is generated correspondingly. The determination made according to the mode that the mobile terminated data MTD corresponds to by the processing circuit 130 is further described in the subsequent paragraphs.

In step S203, under the condition that the object under process is determined to be not the mobile terminated object MT by the processing circuit 130, the object under process is determined to be the mobile originated object MO. The mobile originated object MO is an object transmitted by the communication apparatus 100 through the communication circuit 110 to such as, but not limited to the remote communication apparatus 150. According to the content included therein, the mobile originated object MO can be a command (which is called a mobile originated command MOC in the following description) or a data (which is called a mobile originated data MOD in the following description).

Under the condition that the object under process is determined to be the mobile originated object MO, a transmission process is performed, the related processing priority is set according to a priority of a transmission entity (not illustrated in the figure) that generates the mobile originated object MO and the mobile originated object MO is added to a transmission list TL by the processing circuit 130. The transmission entity is either software or a hardware used to generate the mobile originated object MO. In an embodiment, the transmission entity corresponds to such as, but not limited to an application program that the processing circuit 130 executes.

In step S204, after step S202 or step S203 are finished, whether an object transmission is able to be performed is determined by the processing circuit 130. In an embodiment, the object transmission is determined to be not able to be performed by processing circuit 130 when the network connection between the communication apparatus 100 and the remote communication apparatus 150 is unstable or broken. The object transmission is determined to be able to be performed by processing circuit 130 when the network connection between the communication apparatus 100 and the remote communication apparatus 150 is stable.

In step S205, the response content RP (i.e., the response command RSC or the receiving acknowledged information RACK) that is not able to be transmitted is added to a response list RL by the processing circuit 130 when object transmission is determined to be not able to be performed. The flow returns to step S204 to keep performing determination.

In step S206, the response content RP in the response list RL is transmitted through the communication circuit 110 according to the processing priority first and the mobile originated object MO in the transmission list TL is transmitted through the communication circuit 110 subsequently by the processing circuit 130 when the object transmission is determined to be able to be performed.

As a result, the communication method 200 in FIG. 2 can set the processing priority of the data transmission by the processing circuit 130 according to the different contents of the object under process so as to increase transmission efficiency.

It is appreciated that for the communication method 200 in FIG. 2, more detailed processing steps can be performed in such as, but not limited to the receiving process and the transmission process by the processing circuit 130 according to a type, a content included therein and a corresponding mode of the mobile terminated object MT and the mobile originated object MO. The more detailed processing steps are described in detail in accompany with FIG. 3A and FIG. 3B.

Figure 3A:
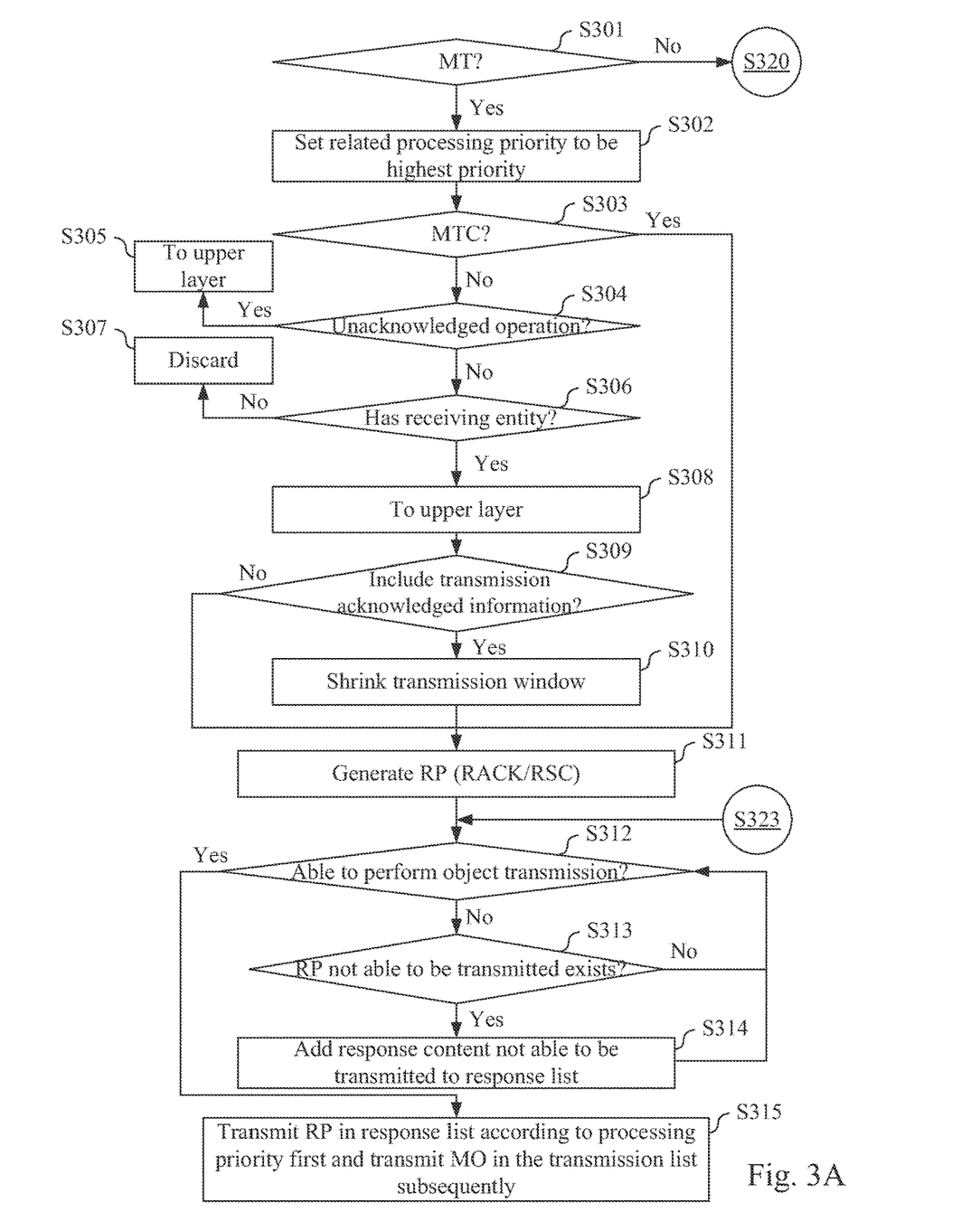
FIG. 3A and FIG. 3B illustrate flow charts of more detailed processes of the communication method in FIG. 2 according to an embodiment of the present invention.
Figure 3B:
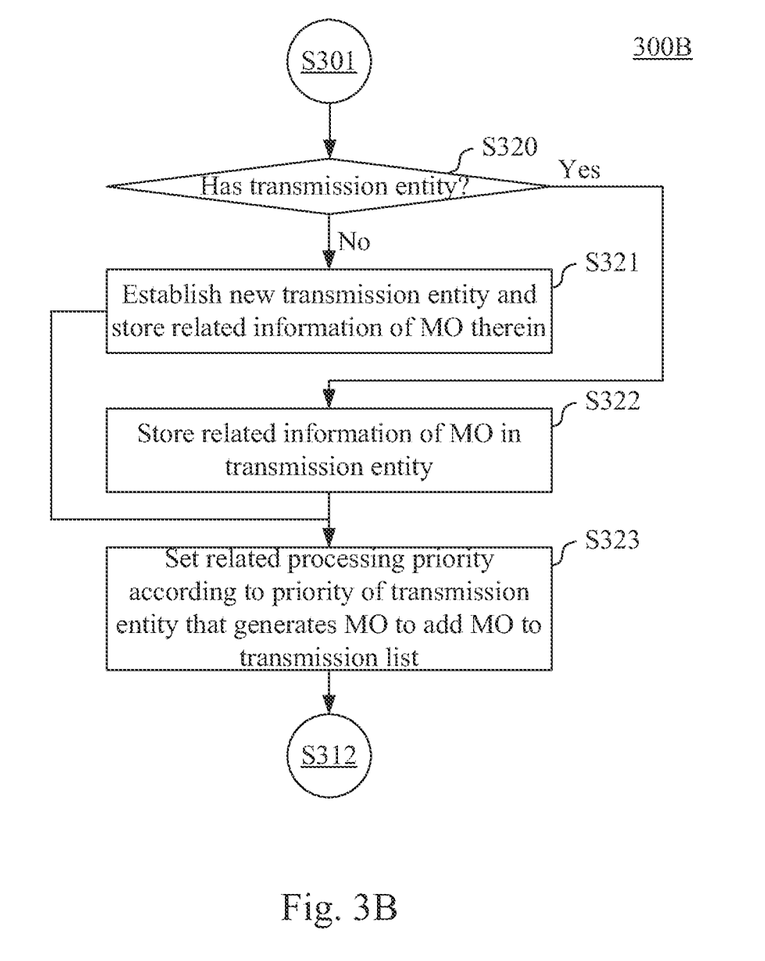

FIG. 3A and FIG. 3B illustrate flow charts of more detailed processes 300A and 300B of the communication method 200 in FIG. 2 according to an embodiment of the present invention.

In step S301, whether the object under process is the mobile terminated object MT is determined by the processing circuit 130.

In step S302, under the condition that the object under process is determined to be the mobile terminated object MT, a related processing priority is set to be the highest priority by the processing circuit 130. In an embodiment, the high or low of the processing priority is determined by a priority value, in which the priority value is set to be 0 to correspond to the highest processing priority.

Furthermore, the receiving process is performed in steps S303-S310 by the processing circuit 130.

In step S303, whether the mobile terminated object MT is the mobile terminated command MTC is determined by the processing circuit 130.

In step S304, under the condition that the mobile terminated object MT is determined to be not the mobile terminated command MTC, the mobile terminated object MT is determined to be the mobile terminated data MTD by the processing circuit 130. Whether the mobile terminated data MTD corresponds to an unacknowledged operation is further determined so as to determine whether a response is required to be performed.

In an embodiment, when the mobile terminated data MTD corresponds to the unacknowledged operation, the condition that the transmission terminal (e.g., the remote communication apparatus 150) of the mobile terminated data MTD does not require the receiving terminal (e.g., the communication apparatus 100) of the mobile terminated data MTD to return the receiving acknowledged information RACK as a response is determined by the processing circuit 130. Under such a condition, the response is determined to be not required to be performed by the processing circuit 130.

On the other hand, when the mobile terminated data MTD corresponds to the acknowledged operation, the condition that the transmission terminal of the mobile terminated data MTD requires the receiving terminal of the mobile terminated data MTD to return the receiving acknowledged information RACK as a response is determined by the processing circuit 130. Under such a condition, the response is determined to be required to be performed by the processing circuit 130.

In step S305, the mobile terminated data MTD is transmitted to an upper layer when the mobile terminated data MTD is determined to correspond to the unacknowledged operation by the processing circuit 130. The upper layer is a higher level of a network model. In an embodiment, the mobile terminated data MTD can be transmitted to such as, but not limited to an application program executed by the processing circuit 130.

Under such a condition, since the response is not required to be performed by the processing circuit 130, the flow is directly finished.

In step S306, when the mobile terminated data MTD is determined to not correspond to the unacknowledged operation, the mobile terminated data MTD is determined to correspond to an acknowledged operation by the processing circuit 130. Whether the mobile terminated data MTD has a corresponding receiving entity (not illustrated in the figure) is further determined. The receiving entity can be either software or a hardware used to receive the mobile terminated data MTD. In an embodiment, the receiving entity corresponds to such as, but not limited to an application program that the processing circuit 130 executes.

In step S307, the mobile terminated data MTD is discarded by the processing circuit 130 when the mobile terminated data MTD is determined to not have the receiving entity.

Under such a condition, since the mobile terminated data MTD is discarded by the processing circuit 130, no acknowledgement is required. The flow is directly finished.

In step S308, the mobile terminated data MTD is transmitted to the upper layer when the mobile terminated data MTD is determined to have the corresponding receiving entity by the processing circuit 130.

In step S309, whether the mobile terminated data MTD includes a transmission acknowledged information (not illustrated in the figure) is selectively determined by the processing circuit 130.

In step S310, an unacknowledged object in a transmission window is set to be an acknowledged object and the transmission window is shrunk to remove the acknowledged transmission object by the processing circuit 130 when the mobile terminated data MTD includes the transmission acknowledged information.

In an embodiment, the transmission window (not illustrated in the figure) is disposed corresponding to the transmitted object by the processing circuit 130. When the communication apparatus 100 serves as a transmission terminal to transmit an object, e.g., a command or a data, to a receiving terminal (such as the remote communication apparatus 150) and requests the receiving terminal to return the transmission acknowledged information as the response, an unacknowledged transmission object that corresponds to such an object is disposed in the transmission window. After the mobile terminated data MTD is determined to include the transmission acknowledged information from the receiving terminal, the unacknowledged object in the transmission window is set to be the acknowledged object and the transmission window is shrunk by the processing circuit 130 to remove the acknowledged transmission object.

In step S311, the receiving process is finished and the corresponding response content RP is generated by the processing circuit 130 when step S310 is finished or the mobile terminated data MTD is determined to not have the transmission acknowledged information in step S309. Under such a condition, the response content RP is the receiving acknowledged information RACK.

On the other hand, under the condition that the mobile terminated object MT is determined to be the mobile terminated command MTC in step S303, the response is determined to be required to be performed and the response content RP is correspondingly generated by the processing circuit 130. Under such a condition, the response content RP is the response command RSC.

Further, under the condition that the object under process is determined to be not the mobile terminated object MT in step S301, the object under process is determined to be the mobile originated object MO by the processing circuit 130 and step S320 of the process 300B in FIG. 3B is proceeded to be executed.

In step S320, whether the mobile originated object MO has the corresponding transmission entity is determined by the processing circuit 130.

In step S321, a new transmission entity corresponding to the mobile originated object MO is established by the processing circuit 130 when the mobile originated object MO is determined to not have the corresponding transmission entity. The related information of the mobile originated object MO is stored in the transmission entity. During the process of establishing the transmission entity, the corresponding priority of such a transmission entity is assigned by the upper layer.

In step S322, when the mobile originated object MO is determined to have the corresponding transmission entity in step S320, the related information of the mobile originated object MO is stored in the transmission entity by the processing circuit 130.

In step S323, after step S321 or step S322 is finished, the transmission process is finished, and the related processing priority is set according to the priority of the transmission entity that generates the mobile originated object MO, so as to add the mobile originated object MO to the transmission list TL.

As described above, in an embodiment, the high or low of the processing priority is determined by the priority value. For the mobile originated object MO, the upper layer may generate the priority value ranging from such as, but not limited to 1-255. The priority value having a smaller value corresponds to a higher processing priority. The priority value having a larger value corresponds to lower processing priority.

Under such a condition, the process 300B is finished by the processing circuit 130 to return to the process 300A in FIG. 3A.

In step S312, whether the object transmission is able to be performed is determined by the processing circuit 130 after step S311 or the step S323 in the process 300B is finished.

In step S313, whether the response content RP that is not able to be transmitted exists is determined when the object transmission is determined to be not able to be performed.

In step S314, the response content RP that is not able to be transmitted is added to the response list RL by the processing circuit 130 when the response content RP that is not able to be transmitted is determined to exist.

When step S314 is finished or the response content RP that is not able to be transmitted is determined to not exist in step S313, the flow goes back to step S312 to keep performing determination.

In step S315, the response content RP in the response list RL is transmitted through the communication circuit 110 according to the processing priority first and the mobile originated object MO in the transmission list TL is transmitted through the communication circuit 110 subsequently by the processing circuit 130 when the object transmission is determined to be able to be performed.

In an embodiment, beside the priority of the transmission entity that generates the mobile originated object MO is generated, the related processing priority is set according to the content and attribute of the mobile originated object MO by the processing circuit 130. For example, the mobile originated object MO can be a retransmitted object or a non-retransmitted object, in which the related processing priority of the retransmitted object is higher than the related processing priority of the non-retransmitted object. On the other hand, the mobile originated object MO is the mobile originated data MOD or the mobile originated command MOC, in which the related processing priority of the mobile originated command MOC is higher than the related processing priority of the mobile originated data MOD.

How the object transmission is performed by the processing circuit 130 according to different settings of the processing priority is described based on an example in the following paragraphs.

Figure 4:
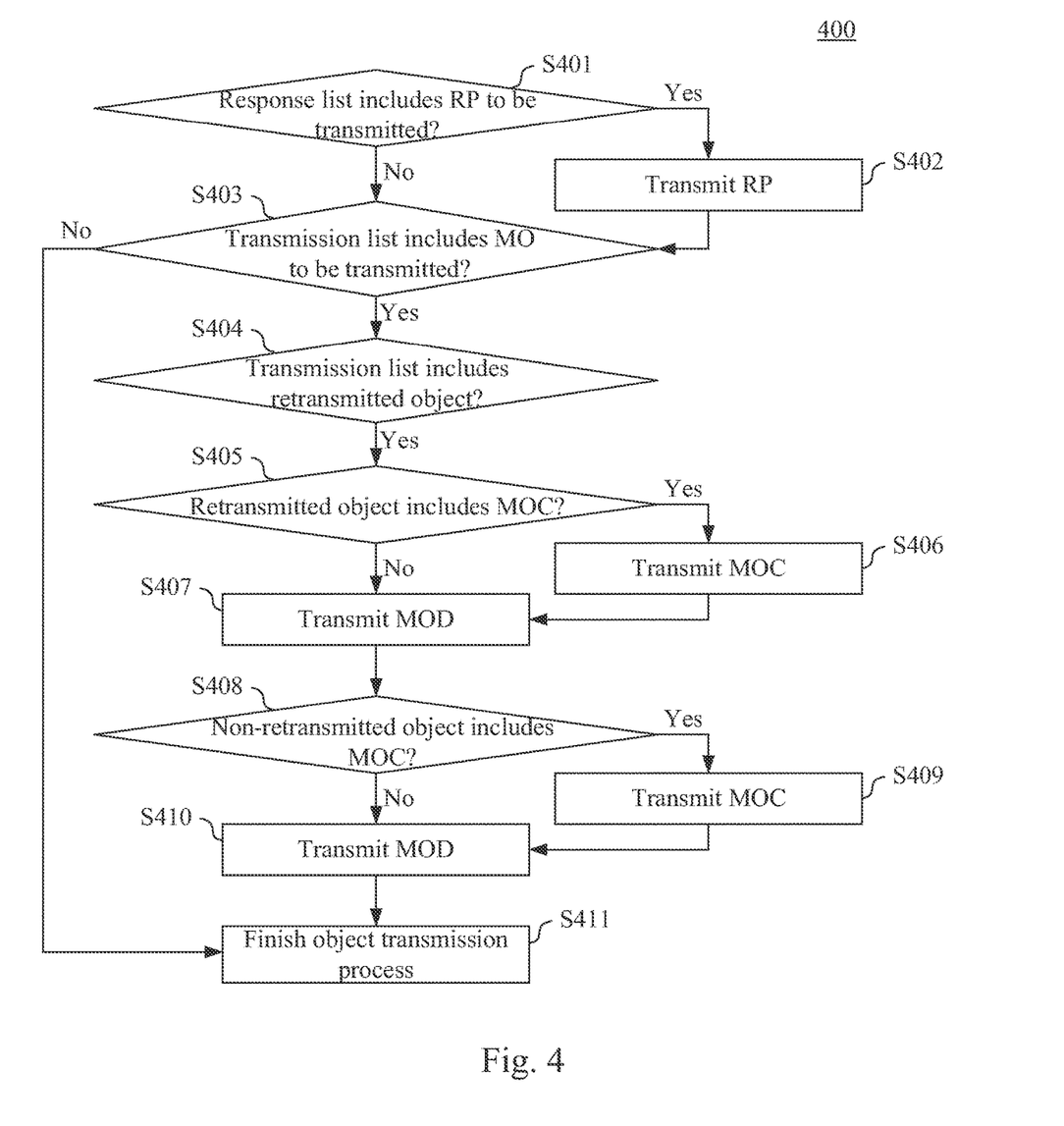
FIG. 4 illustrates a flow chart of an object transmission process performed by the processing circuit according to an embodiment of the present invention.

Reference is now made to FIG. 4. FIG. 4 illustrates a flow chart of an object transmission process 400 performed by the processing circuit 130 according to an embodiment of the present invention. The object transmission process 400 can be used in step S315 in FIG. 3 to describe how the object transmission is performed by the processing circuit 130 according to the processing priority in detail.

In step S401, whether the response list RL includes the response content RP to be transmitted is determined when the object transmission is determined to be able to be performed by the processing circuit 130.

In step S402, the transmission of the response content RP is performed by the processing circuit 130 when the response list RL is determined to include the response content RP to be transmitted.

In step S403, after step S402 is finished or when the response list RL is determined to not include the response content RP to be transmitted in step S401, whether the transmission list TL includes the mobile originated object MO to be transmitted is determined.

In step S404, whether the transmission list TL includes the mobile originated object MO that is the retransmitted object is further determined by the processing circuit 130 when the transmission list TL is determined to include the mobile originated object MO to be transmitted.

In step S405, whether the retransmitted object includes the mobile originated command MOC is determined by the processing circuit 130 when the transmission list TL is determined to include the mobile originated object MO that is the retransmitted object.

In step S406, the transmission of the retransmitted object that is the mobile originated command MOC is performed by the processing circuit 130 when the retransmitted object is determined to include the mobile originated command MOC.

In step S407, after step S406 is finished or when the retransmitted object is determined to not include the mobile originated command MOC in step S405, the transmission of the retransmitted object that is the mobile originated data MOD is performed by the processing circuit 130.

In step S408, after step S407 is finished or when the transmission list TL is determined to not include the mobile originated object MO that is the retransmitted object in step S404, besides the condition that all the transmission list TL includes are the non-retransmitted object is determined, whether the non-retransmitted object in the transmission list TL includes the mobile originated object MO that is the mobile originated command MOC is further determined by the processing circuit 130.

In step S409, the transmission of the non-retransmitted object that is the mobile originated command MOC is performed by the processing circuit 130 when the non-retransmitted object is determined to include the mobile originated command MOC.

In step S410, after step S409 is finished or when the non-retransmitted object is determined to not include the mobile originated command MOC in step S408, the transmission of the non-retransmitted object that is the mobile originated data MOD is performed by the processing circuit 130.

In step S411, after step S410 is finished or when the transmission list TL is determined to not include the mobile originated object MO to be transmitted in step S403, the object transmission process 400 is finished.

It is appreciated that the embodiments described above are merely an example. In other embodiments, it should be appreciated that many modifications and changes may be made by those of ordinary skill in the art without departing, from the spirit of the disclosure.

In summary, the present invention discloses the communication apparatus and the communication method having data transmission sorting mechanism to set the processing priority of data transmission according to the attributes, e.g., a type, a transmission entity priority and a determination of whether a retransmission is performed, of the object under process so as to increase transmission efficiency.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A communication apparatus having data transmission sorting mechanism and configured to perform communication based on a reliable data service (RDS) protocol, comprising:
   a communication circuit;
   a storage circuit configured to store computer executable command; and
   a processing circuit electrically coupled to the communication circuit and the storage circuit, and configured to retrieve the computer executable command to execute a communication method, comprising:
      determining whether an object under process is a mobile terminated object received through the communication circuit;
      under the condition that the object under process is determined to be the mobile terminated object, setting a related processing priority to be a highest priority, performing a receiving process and generating a response content when a response is required to be performed;
      under the condition that the object under process is determined to be a mobile originated object, performing a transmission process, setting the related processing priority according to a priority of a transmission entity that generates the mobile originated object and adding the mobile originated object to a transmission list;
      adding the response content that is not able to be transmitted to a response list when an object transmission is determined to be not able to be performed; and
      transmitting the response content in the response list through the communication circuit according to the processing priority first and transmitting the mobile originated object in the transmission list through the communication circuit subsequently when the object transmission is determined to be able to be performed.

2. The communication apparatus of claim 1, wherein the receiving process comprises:
   determining whether the mobile terminated object is a mobile terminated command;
   under the condition that the mobile terminated object is determined to be a mobile terminated data, determining whether the mobile terminated data corresponds to an unacknowledged operation and transmitting the mobile terminated data to an upper layer when the mobile terminated data corresponds to the unacknowledged operation;
   determining whether the mobile terminated data has a corresponding receiving entity when the mobile terminated data corresponds to an acknowledged operation and discarding the mobile terminated data when the mobile terminated data does not have the receiving entity;
   transmitting the mobile terminated data to the upper layer when the mobile terminated data has the corresponding receiving entity;
   finishing the receiving process and generating the corresponding response content when the mobile terminated data is transmitted to the upper layer, wherein the response content is a receiving acknowledged information; and
   under the condition that the mobile terminated object is determined to be the mobile terminated command, finishing the receiving process and generating the corresponding response content, wherein the response content is a response command.

3. The communication apparatus of claim 2, wherein the receiving process further comprises:
   determining whether the mobile terminated data comprises a transmission acknowledged information; and
   setting an unacknowledged object in a transmission window to be an acknowledged object and shrinking the transmission window to remove the acknowledged transmission object when the mobile terminated data comprises the transmission acknowledged information.

4. The communication apparatus of claim 1, wherein the transmission process comprises:
   determining whether the mobile originated object has the corresponding transmission entity;
   establishing a new transmission entity corresponding to the mobile originated object when the mobile originated object does not have the corresponding transmission entity; and
   storing related information of the mobile originated object in the transmission entity, finishing the transmission process and setting the related processing priority to add the mobile originated object to the transmission list.

5. The communication apparatus of claim 1, wherein the communication method further comprises:
   setting the related processing priority according to the priority of the transmission entity that generates the mobile originated object and a content attribute of the mobile originated object;
   wherein the mobile originated object is a retransmitted object or a non-retransmitted object, and the related processing priority of the retransmitted object is higher than the related processing priority of the non-retransmitted object; and
   the mobile originated object is a mobile originated data or a mobile originated command, and the related processing priority of the mobile originated command is higher than the related processing priority of the mobile originated data.

6. A communication method having data transmission sorting mechanism used in a communication apparatus, wherein the communication apparatus is configured to perform communication based on a reliable data service protocol, the communication method comprising:
   determining whether an object under process is a mobile terminated object received through a communication circuit;
   under the condition that the object under process is determined to be the mobile terminated object, setting a related processing priority to be a highest priority, performing a receiving process and generating a response content when a response is required to be performed;
   under the condition that the object under process is determined to be a mobile originated object, performing a transmission process, setting the related processing priority according to a priority of a transmission entity that generates the mobile originated object and adding the mobile originated object to a transmission list;
      adding the response content that is not able to be transmitted to a response list when an object transmission is determined to be not able to be performed; and
   transmitting the response content in the response list through the communication circuit according to the processing priority first and transmitting the mobile originated object in the transmission list through the communication circuit subsequently when the object transmission is determined to be able to be performed.

7. The communication method of claim 6, wherein the receiving process comprises:
   determining whether the mobile terminated object is a mobile terminated command;
   under the condition that the mobile terminated object is determined to be a mobile terminated data, determining whether the mobile terminated data corresponds to an unacknowledged operation and transmitting the mobile terminated data to an upper layer when the mobile terminated data corresponds to the unacknowledged operation;
   determining whether the mobile terminated data has a corresponding receiving entity when the mobile terminated data corresponds to an acknowledged operation and discarding the mobile terminated data when the mobile terminated data does not have the receiving entity;
   transmitting the mobile terminated data to the upper layer when the mobile terminated data has the corresponding receiving entity;
   finishing the receiving process and generating the corresponding response content when the mobile terminated data is transmitted to the upper layer, wherein the response content is a receiving acknowledged information; and
   under the condition that the mobile terminated object is determined to be the mobile terminated command, finishing the receiving process and generating the corresponding response content, wherein the response content is a response command.

8. The communication method of claim 7, wherein the receiving process further comprises:
   determining whether the mobile terminated data comprises a transmission acknowledged information; and
   setting an unacknowledged object in a transmission window to be an acknowledged object and shrinking the transmission window to remove the acknowledged transmission object when the mobile terminated data comprises the transmission acknowledged information.

9. The communication method of claim 6, wherein the transmission process comprises:
   determining whether the mobile originated object has the corresponding transmission entity;
   establishing a new transmission entity corresponding to the mobile originated object when the mobile originated object does not have the corresponding transmission entity; and
   storing related information of the mobile originated object in the transmission entity, finishing the transmission process and setting the related processing priority to add the mobile originated object to the transmission list.

10. The communication method of claim 6, further comprising:
    setting the related processing priority according to the priority of the transmission entity that generates the mobile originated object and a content attribute of the mobile originated object;
    wherein the mobile originated object is a retransmitted object or a non-retransmitted object, and the related processing priority of the retransmitted object is higher than the related processing priority of the non-retransmitted object; and
    the mobile originated object is a mobile originated data or a mobile originated command, and the related processing priority of the mobile originated command is higher than the related processing priority of the mobile originated data.

* * * * *